(12) United States Patent
Pelfrey et al.

(10) Patent No.: US 9,611,949 B2
(45) Date of Patent: Apr. 4, 2017

(54) BI-DIRECTIONAL HOSE BREAK-AWAY ASSEMBLY

(71) Applicant: EMERSON PROCESS MANAGEMENT REGULATOR TECHNOLOGIES, INC., McKinney, TX (US)

(72) Inventors: Roy Ronald Pelfrey, Sherman, TX (US); Jake Buford, McKinney, TX (US); Mark A. Michnevitz, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 14/683,639

(22) Filed: Apr. 10, 2015

(65) Prior Publication Data

US 2015/0292638 A1 Oct. 15, 2015

Related U.S. Application Data

(60) Provisional application No. 61/978,651, filed on Apr. 11, 2014.

(51) Int. Cl.
F16K 17/36 (2006.01)
F16L 29/00 (2006.01)
(Continued)

(52) U.S. Cl.
CPC ............ *F16K 17/36* (2013.01); *F16L 29/007* (2013.01); *F16L 35/00* (2013.01); *F16L 55/1007* (2013.01)

(58) Field of Classification Search
CPC . F16K 17/36; F16L 55/10; F16L 35/00; F16L 29/00
(Continued)

(56) References Cited

U.S. PATENT DOCUMENTS

| 1,948,725 A | * | 2/1934 | McClintock | ............ F22B 37/78 |
| | | | | 122/504 |
| 2,417,350 A | * | 3/1947 | Conroy | ................. B23P 11/005 |
| | | | | 285/332 |

(Continued)

FOREIGN PATENT DOCUMENTS

WO    WO-02070934 A1    9/2002

OTHER PUBLICATIONS

Search Report for International application No. PCT/US2015/025220, mailed Jul. 2, 2015.

(Continued)

*Primary Examiner* — Kevin Murphy
*Assistant Examiner* — Minh Le
(74) *Attorney, Agent, or Firm* — Marshall, Gerstein & Borun LLP (57) ABSTRACT

A bi-directional hose break-away assembly includes a first adapter section and a second adapter section that are operatively connected by a hose section. A first valve assembly is disposed within the first adapter section and a second valve assembly is disposed within the second adapter section. The first and second valve assemblies are operatively connected by a stem connector so that the first and second valve assemblies will close in the event a maximum tensile load is exceeded, thereby preventing spillage of liquefied chemicals.

23 Claims, 5 Drawing Sheets

(51) Int. Cl.
*F16L 35/00* (2006.01)
*F16L 55/10* (2006.01)

(58) Field of Classification Search
USPC ....... 137/68.11, 68.14, 68.15, 68.16, 614.05, 137/614.02, 614.06, 614.04; 285/386, 285/388, 387
See application file for complete search history.

(56) References Cited

U.S. PATENT DOCUMENTS

| | | | | |
|---|---|---|---|---|
| 3,273,578 A * | 9/1966 | Clark | ................. | B64D 37/32 137/614 |
| 3,539,207 A * | 11/1970 | Harris | ................. | F16L 33/01 285/256 |
| 3,653,692 A * | 4/1972 | Henson | ................. | F16L 33/22 285/242 |
| 3,955,835 A * | 5/1976 | Farrington | ................. | F15D 1/02 138/37 |
| 4,351,352 A * | 9/1982 | Meisenheimer, Jr. | ................. | F16L 55/1007 137/15.09 |
| 4,674,525 A * | 6/1987 | Richards | ................. | F16L 55/1007 137/543.17 |
| 4,827,977 A * | 5/1989 | Fink, Jr. | ................. | F16L 55/1015 137/614.04 |
| 4,886,087 A * | 12/1989 | Kitchen | ................. | F16L 41/10 137/614.04 |
| 4,896,688 A * | 1/1990 | Richards | ................. | F16L 55/1007 137/614.04 |
| 4,899,786 A * | 2/1990 | Morris | ................. | F16L 55/1015 137/614.01 |
| 4,899,792 A * | 2/1990 | Podgers | ................. | F16L 27/047 137/68.14 |
| 4,921,000 A * | 5/1990 | King | ................. | B63B 27/24 137/68.14 |
| 5,054,509 A * | 10/1991 | Grantham | ................. | F16L 55/1007 137/68.14 |
| 5,357,998 A * | 10/1994 | Abrams | ................. | F16L 55/005 137/614.04 |
| 5,529,085 A * | 6/1996 | Richards | ................. | F16K 17/40 137/68.15 |
| 5,605,359 A * | 2/1997 | Hoff | ................. | F16L 33/00 285/259 |
| 5,699,822 A * | 12/1997 | Bodhaine | ................. | F16L 29/00 137/614.04 |
| 5,826,610 A * | 10/1998 | Bodhaine | ................. | F16L 29/00 137/614.04 |
| 6,123,123 A * | 9/2000 | Carder, Sr. | ................. | B67D 7/32 137/68.15 |
| 6,206,040 B1* | 3/2001 | Smith, III | ................. | F16L 1/26 137/614 |
| 7,278,440 B2* | 10/2007 | Boyd | ................. | F16K 17/366 137/614.04 |
| 7,575,023 B2* | 8/2009 | Fraser | ................. | F16K 17/40 137/614.04 |
| 7,980,173 B2* | 7/2011 | Carmack | ................. | B30B 9/3046 100/240 |
| 8,001,995 B2* | 8/2011 | Molloy | ................. | F01M 11/0408 138/89 |
| 8,578,957 B2* | 11/2013 | Wolff | ................. | F16L 55/1007 137/614.04 |
| 9,279,529 B2* | 3/2016 | Zhang | ................. | F16L 29/04 |
| 2010/0276008 A1 | 11/2010 | Abrams | | |
| 2012/0234423 A1 | 9/2012 | Cardona | | |

OTHER PUBLICATIONS

Written Opinion for International application No. PCT/US2015/025220, mailed Jul. 2, 2015.

\* cited by examiner

FIG. 5

BI-DIRECTIONAL HOSE BREAK-AWAY ASSEMBLY

FIELD OF THE DISCLOSURE

The present disclosure generally relates to break-away assembly for fluid hoses and more specifically to a bi-directional hose break-away assembly for fluid hoses.

BACKGROUND

Transportation of liquefied chemicals is usually conducted through pipelines or by tanker vehicles. When tanker vehicles, such as tanker trucks, tanker aircraft, or tanker ships, move liquefied chemicals from an origin to a destination, the liquefied chemicals must be uploaded to the tanker vehicle at the origin and downloaded from the tanker vehicle to a storage device at the destination. Generally, a pump and hose arrangement is used for upload or download operations, with the pump providing power to move the liquefied chemicals through the hose from one point to another.

Transportation of liquefied chemicals is particularly prevalent in the liquid petro-chemical industry, more particularly, in the liquid propane and gas industry. Often, consumers in remote areas that do not have access to traditional municipal utility services will have a large liquid propane tank on site for storage of liquid propane. The liquid propane may be used for home energy needs, such as heating and cooking. Periodically the liquid propane tank needs to be refilled. A liquid propane tanker truck brings liquid propane to the home site. A pump and hose on the tanker truck are used to transfer the liquid propane from the tanker truck to the liquid propane tank. Similar transfer operations are used in commercial operations and in other liquid chemical industries.

Occasionally, the hose may rupture or leak, or the tanker truck operator may forget to disconnect the hose when leaving the site, causing the hose to break. If the valves on the tanker truck and on the propane tank are open when the hose breaks, liquid propane will be released to the surrounding area causing a hazardous situation.

DETAILED DESCRIPTION

Figure 1:
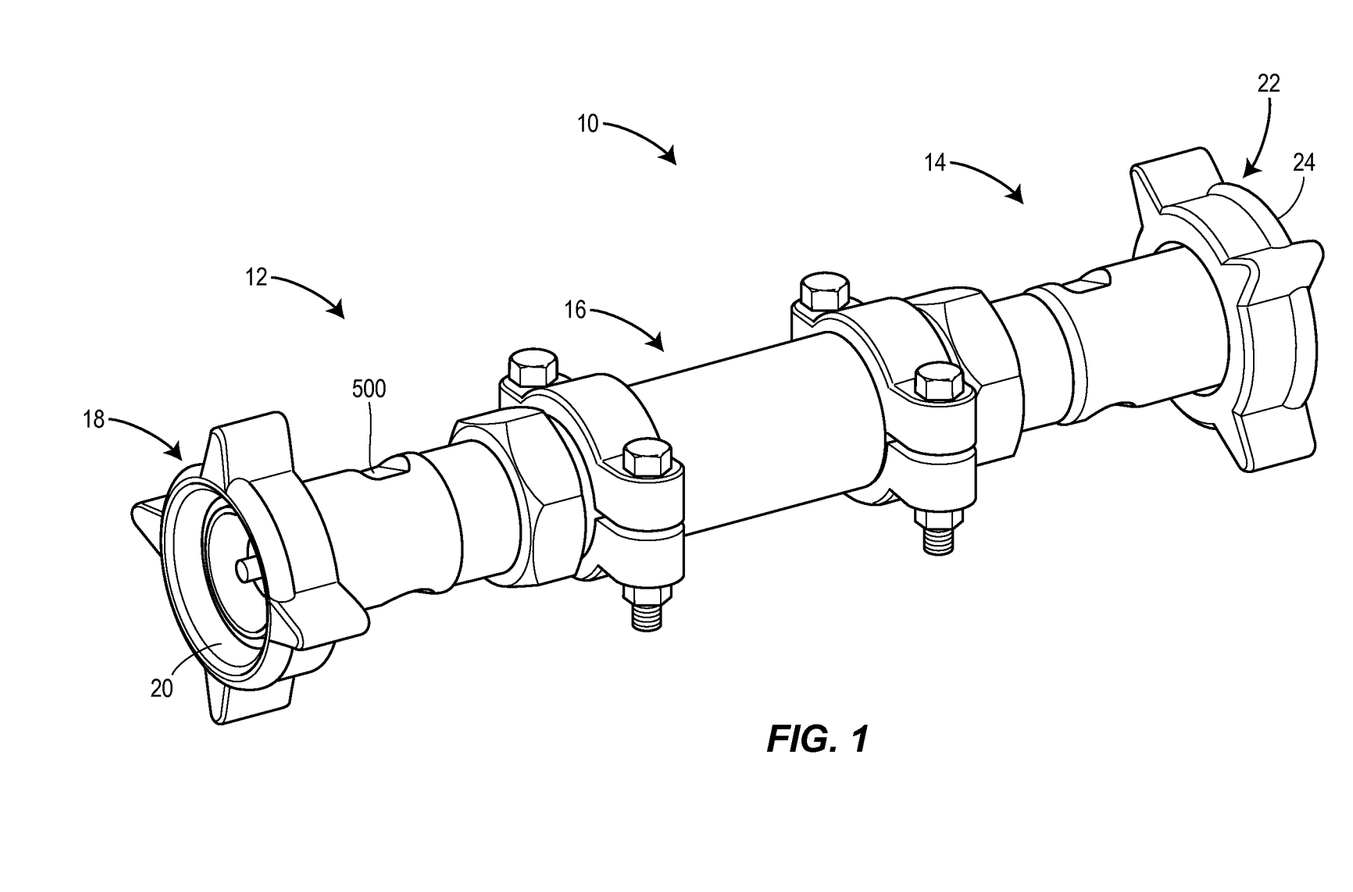
FIG. 1 is a perspective view of a break-away assembly constructed in accordance with the teachings of the disclosure.

Turning now to FIG. 1, a break-away assembly 10 for a fluid is illustrated. The break-away assembly 10 includes a first adapter portion 12 and a second adapter portion 14 that are connected to one another by a hose portion 16. In the embodiment illustrated in the figures, the first adapter portion 12 is a female portion and the second adapter portion 14 is a male portion, as will be further described below. In other embodiments, the first adapter portion may be a male portion and the second adapter portion may be a female portion. Regardless, the first adapter portion 12 is configured to be releasably secured to a liquefied chemical source, for example a tanker truck, and the second adapter portion 14 is configured to be releasably secured to a liquefied chemical destination, for example, a liquid propane tank. In other embodiments the first adapter portion 12 and the second adapter portion 14 may be configured for releasable attachment to other sources and/or destinations for the liquefied chemicals. The first adapter portion 12 may include a first fitting 18 having inner female threads 20. Similarly, the second adapter portion 14 may include a second fitting 22 also having inner female threads 24. The inner female threads 20, 24, may be configured to threadingly engage male threads of the liquefied chemical source and the liquefied chemical destination, respectively, or vice versa. In yet other embodiments, the first and second fittings 18, 22 may have outer male threads that are configured to threadingly engage female threads on the liquefied chemical source and liquefied chemical destination, respectively, or vice versa.

Figure 2:
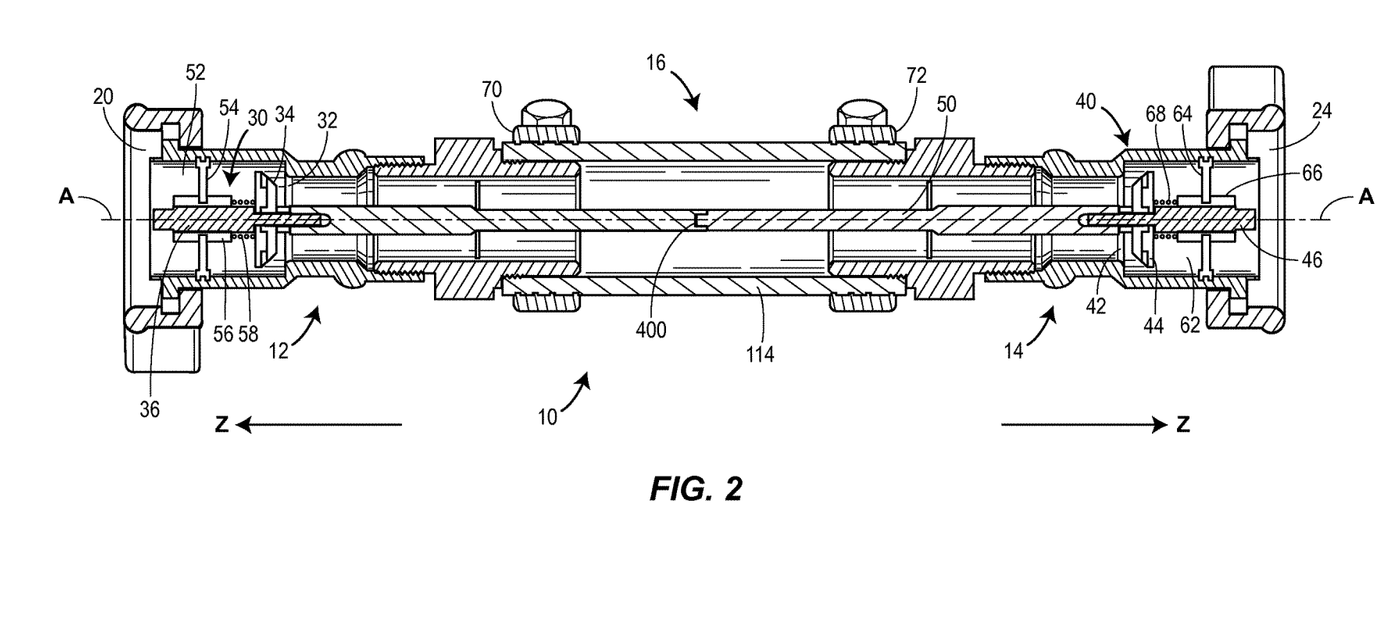
FIG. 2 is a longitudinal cross-sectional view of the break-away assembly of FIG. 1.

FIG. 2 illustrates inner components of the break-away assembly 10. The first adapter portion 12 includes a first valve assembly 30 and the second adapter portion 14 includes a second valve assembly 40. The first valve assembly 30 and the second valve assembly 40 are operatively and releasably connected to one another by a stem connector 50.

The first valve assembly 30 includes a first valve seat 32 and a first valve plug 34 that cooperate to permit or prevent fluid flow through the first valve assembly 30. The first valve assembly 30 also includes a first valve extension 36, the first valve plug 34 being operatively attached to the first valve extension 36. The first valve extension 36 may be centrally located within the first adapter section 12. In some embodiments, for example as illustrated in the embodiment of FIG. 2, the first valve extension 36 may have a longitudinal axis that is coincident with a longitudinal axis A of the stem connector 50. The first valve extension 36 may be secured within a first central bore 52 of the first adapter portion 12 with a first mounting bracket 54. The first mounting bracket 54 may be secured to the first central bore 52 by any known means, including, but not limited to, welds, fasteners, interference fits, adhesives, etc. A first spring seat 56 may be operatively connected to the first mounting bracket 54. The first spring seat 56 may include a central bore that is sized and shaped to receive a portion of the first stem extension 36. A first biasing element, such as a first spring 58, may be disposed between the first spring seat 56 and the first valve plug 34. The first spring 58 may bias the first valve plug 34 towards the first valve seat 32.

Similar to the first valve assembly 30, the second valve assembly 40 includes a second valve seat 42 and a second valve plug 44 that cooperate to permit or prevent fluid flow through the second valve assembly 40. The second valve assembly 40 also includes a second valve extension 46, the second valve plug 44 being operatively attached to the second valve extension 46. The second valve extension 46 may be centrally located within the second adapter section 14. In some embodiments, for example as illustrated in the embodiment of FIG. 2, the second valve extension 46 may have a longitudinal axis that is coincident with the longitudinal axis A of the stem connector 50. The second valve extension 46 may be secured within a second central bore 62 of the second adapter portion 14 with a second mounting bracket 64. The second mounting bracket 64 may be secured to the second central bore 62 by any known means, including, but not limited to, welds, fasteners, interference fits, adhesives, etc. A second spring seat 66 may be operatively connected to the second mounting bracket 64. The second spring seat 66 may include a central bore that is sized and shaped to receive a portion of the second stem extension 46. A second biasing element, such as a second spring 68, may be disposed between the second spring seat 66 and the second valve plug 44. The second spring 68 may bias the second valve plug 44 towards the second valve seat 42.

As discussed above, the first adapter portion 12 and the second adapter portion 14 are operatively and releasably connected to one another by the hose portion 16. The hose portion 16 may be operatively and releasably secured to the first adapter portion 12 by a first clamp 70. Similarly, the hose portion 16 may be operatively and releasably secured to the second adapter portion 14 by a second clamp 72. The first clamp 70 and the second clamp 72 provide sufficient force to secure the hose portion 16 to the first and second adapter portions 12, 14, during normal operations, but are designed to be the first point of failure if the first and second adapter portions 12, 14 are pulled apart from one another. In other words, the first and second clamps 70, 72 are designed to be the first points of failure if the break-away assembly 10 is subject to a tensile force that exceeds a predetermined magnitude.

Figure 3:
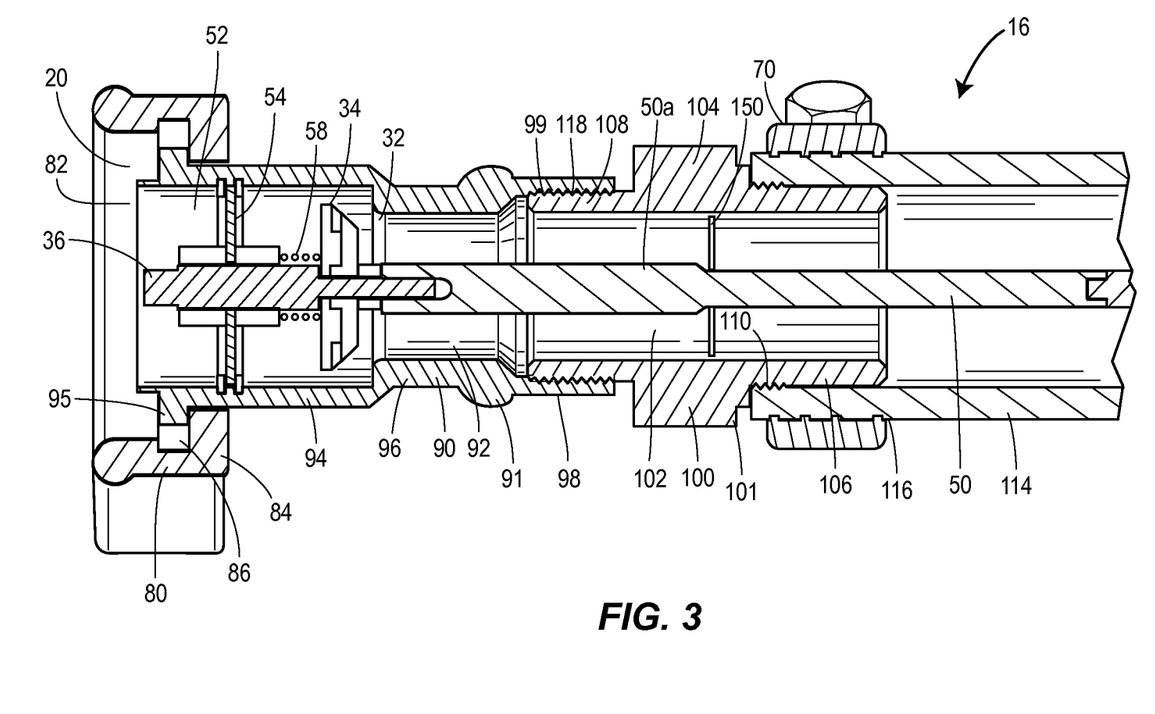
FIG. 3 is a longitudinal cross-sectional view of a female portion of the break-away assembly of FIG. 2.

Turning now to FIG. 3, the first adapter portion 12 is illustrated in more detail. The first adapter portion 12 may include an outer coupling portion 80 that is configured to be attached to a source of liquefied chemicals or a destination for liquefied chemicals, a center conduit portion 90 that directs liquefied chemicals to and from the outer coupling portion 80, and an inner coupling portion 100 that is configured to be attached to the hose portion 16.

The outer coupling portion 80 may include a body 81 having a central bore 82 having the female threads 20. At one end, the outer coupling portion 80 may include an inner flange 84 that extends radially inward from the body 81. An annular channel 86 may be formed on the central bore 82, proximate the inner flange 84.

The center conduit portion 90 may include a body 91 having a central bore 92, through which liquefied chemicals may flow. The central bore 92 may include a first portion 94 having a first diameter, a second portion 96 having a second diameter that is different from the first diameter, and a third portion 98 having a third diameter that is different from the second diameter. The first valve seat 32 may form a junction between the first portion 94 and the second portion 96. The first portion 94 may include an outer annular flange 95 that extends radially outward from one end of the first portion 94. The outer annular flange 95 may be sized and shaped to be at least partially received within the annular channel 86 of the outer coupling portion 80, so that the outer coupling portion 80 and the center conduit portion 90 are rotatably secured to one another. The third portion 98 may include inner threads 99 at one end.

The inner coupling portion 100 includes a body 101 having a central bore 102 and an outer annular extension 104 that separates a first mating portion 106 from a second mating portion 108. The first mating portion 106 may include outer threads 110 that help the first mating portion 106 grip a portion of a hose 114. The first clamp 70 may generally surround the first mating portion 106, with an end of the hose 114 being disposed between the first clamp 70 and the first mating portion 106. The first clamp 70 may include inner threads 116 that grip the hose 114, similar to the threads 110. The second mating portion 108 may include outer threads 118 that threadedly engage the inner threads 99 of the third portion 98. A stem guide 150 may be disposed within the central bore 102 to stabilize and support the stem connector 50. The stem guide 150 will be discussed further below.

The first stem extension 36 may be operatively connected to a female portion 50a of the stem connector 50, so that the first stem extension 36 remains longitudinally fixed with respect to the female portion 50a. In other words, the first stem extension 36 and the female portion 50a move together relative to the outer coupling portion 80, the center conduit portion 90, and the inner coupling portion 100.

Figure 4:
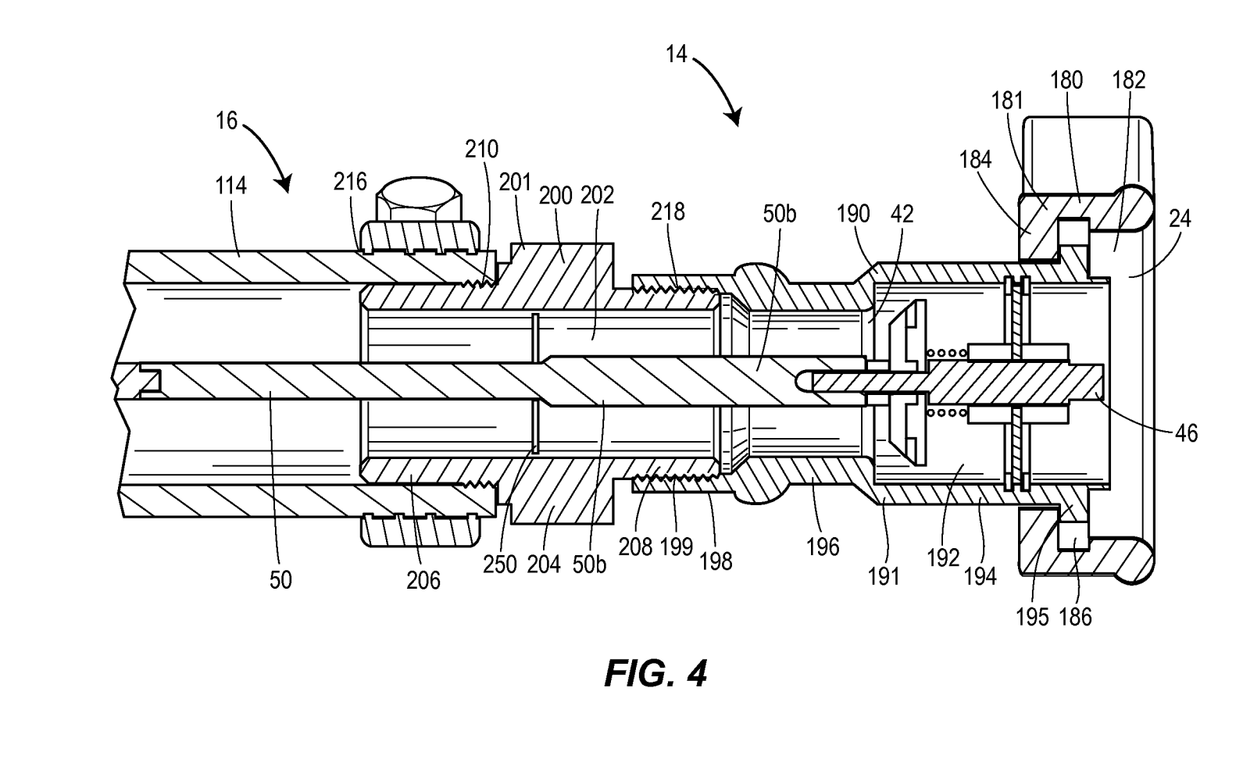
FIG. 4 is a longitudinal cross-sectional view of a male portion of the break-away assembly of FIG. 2.

Turning now to FIG. 4, similar to the first adapter portion 12, the second adapter portion 14 is illustrated in more detail. The second adapter portion 14 is essentially a mirror image of the first adapter portion 12, with some exceptions. The second adapter portion 14 may include an outer coupling portion 180 that is configured to be attached to a source of liquefied chemicals or a destination for liquefied chemicals, a center conduit portion 190 that directs liquefied chemicals to and from the outer coupling portion 180, and an inner coupling portion 200 that is configured to be attached to the hose portion 16.

The outer coupling portion 180 may include a body 181 having a central bore 182 having the female threads 24. At one end, the outer coupling portion 180 may include an inner flange 184 that extends radially inward from the body 181. An annular channel 186 may be formed on the central bore 182, proximate the inner flange 184.

The center conduit portion 190 may include a body 191 having a central bore 192, through which liquefied chemicals may flow. The central bore 192 may include a first portion 194 having a first diameter, a second portion 196 having a second diameter that is different from the first diameter, and a third portion 198 having a third diameter that is different from the second diameter. The valve seat 42 may form a junction between the first portion 194 and the second portion 196. The first portion 194 may include an outer annular flange 195 that extends radially outward from one end of the first portion 194. The outer annular flange 195 may be sized and shaped to be at least partially received within the annular channel 186 of the outer coupling portion 180, so that the outer coupling portion 180 and the center conduit portion 190 are rotatably secured to one another. The third portion 198 may include inner threads 199 at one end.

The inner coupling portion 200 includes a body 201 having a central bore 202 and an outer annular extension 204 that separates a first mating portion 206 from a second mating portion 208. The first mating portion 206 may include outer threads 210 that help the first mating portion 206 grip a portion of a hose 114. The second clamp 72 may generally surround the first mating portion 206, with an end of the hose 114 being disposed between the second clamp 72 and the first mating portion 206. The second clamp 72 may include inner threads 216 that grip the hose 114, similar to the threads 210. The second mating portion 208 may include outer threads 218 that threadedly engage the inner threads 199 of the third portion 198. A stem guide 250 may be disposed within the central bore 202 to stabilize and support the stem connector 50. The stem guide 250 will be discussed further below.

The second stem extension 46 may be operatively connected to a male portion 50b of the stem connector 50, so that the second stem extension 46 remains longitudinally fixed with respect to the male portion 50b. In other words, the second stem extension 46 and the male portion 50b move together relative to the outer coupling portion 180, the center conduit portion 190, and the inner coupling portion 200.

Figure 5:
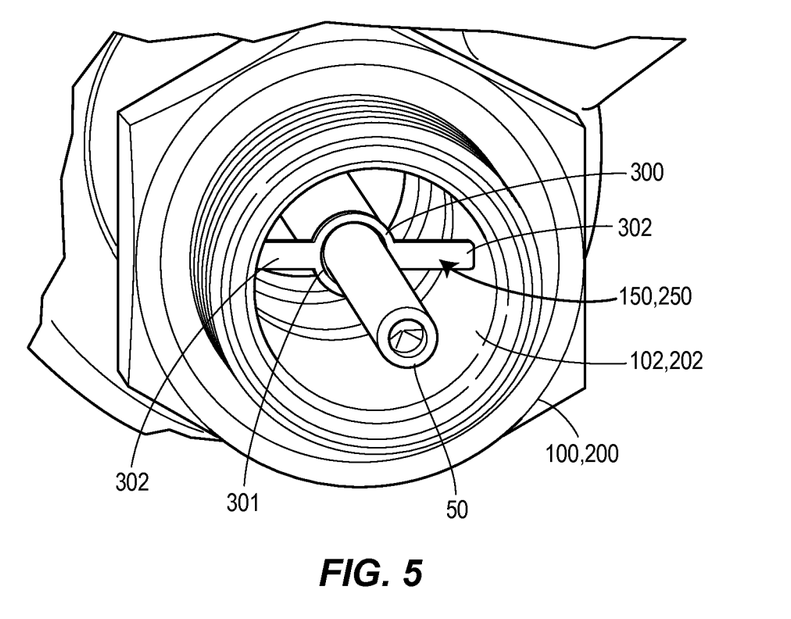
FIG. 5 is an inner perspective view of a stem guide located in one of the female portion and the male portion of the break-away assembly of FIG. 1.

Turning now to FIG. 5, one example of a stem guide 150, 250 is illustrated. The stem guide 150, 250 includes a central body portion 300 having a central opening 301. The central opening 301 is sized and shaped to receive the stem connector 50. A plurality of outwardly extending wings 302 extend radially outwardly from the body portion 300. At least one of the outwardly extending wings 302 spans the distance between an outer surface of the stem connector 50 and the inner surface of the central bore 102, 202. The outwardly extending wings 302 stabilize the stem connector 50 in the center of the central bore 102, 202, and the outwardly extending wings 302 maintain the stem connector 50 in proper alignment.

Returning now to FIG. 2, operation of the break-away assembly 10 will be further discussed. When the break-away assembly 10 is subjected to tensile forces in the direction of arrows Z, the first and second clamps 70, 72 will keep the first and second adapter portions 12, 14 secured to the hose portion 16 up to a first limit force. The limit force may be dependent upon several factors including strength of the clamps 70, 72, strength of the hose 114, etc. First limit force is used here to mean the maximum force at which the clamps 70, 72 will maintain connection between the first adapter section and the hose 114 or between the second adapter section and the hose, or the maximum force that the hose 114 is capable of withstanding before failure. Once the limit force is reached, either one of the clamps 70, 72 will fail or the hose 14 will fail. Regardless, after failure, the first adapter section 12 will be pulled apart from the second adapter section 14. As the first and second adapter sections 12, 14 move away from one another, the stem connector 50 will maintain relative positions of the first valve plug 34 and the second valve plug 44. The first valve seat 32 and the second valve seat 42 will move away from one another until the first valve seat 32 contacts the first valve plug 34 and the second valve seat 42 contacts the second valve plug 44, which prevents fluid flow through the first and second valve assemblies 30, 40.

The stem connector 50 will maintain relative positions of the first and second adapter sections 12, 14 (due to the contact between the valve plugs and valve seats) up to a second limit force. A second limit force is used here to mean the maximum force at which the stem connector 50 can maintain structural integrity before failure. Once the second limit force is reached, the stem connector 50 will fail and the first adapter portion and the second adapter portion will once again be pulled apart. In some embodiments, the stem connector 50 may be designed to fail at a predetermined point (e.g., connection point 400) and/or at a predetermined force to prevent any damage to other equipment and/or personnel. After the stem connector 50 fails, the first valve plug 34 is held against the first valve seat 32 by the first spring 58 and the second valve plug 44 is held against the second valve seat 42 by the second spring 68, thereby preventing spillage of liquid chemicals through either the first adapter section 12 or the second adapter section 14.

In some embodiments, the first and/or second adapter sections may be made of brass for propane operations. In other embodiments, the first and/or second adapter sections may be made of stainless steel for anhydrous ammonia operations.

In some embodiments, one or more of the body components may include recesses or tool flats 500 (see FIG. 1) for wrenching or other securing operations.

The disclosed break-away assembly acts as a safety device for the transfer of liquefied chemicals. The disclosed break-away assembly advantageously may be retrofitted on existing transfer hoses, thereby reducing capital expenditures to bring transfer equipment into compliance with local safety regulations, such as NFPA 58 (version 2014). Additionally, the disclosed break-away assembly may be field repaired in the event of a hose break-away. For example, if the break-away assembly activates due to exceeding maximum tensile load. The failed portion (usually the hose or clamps) may be quickly and easily replaced, thereby restoring the break-away assembly to functional capacity.

In light of the foregoing, the description of the present disclosure should be understood as merely providing examples of the present invention and, thus, variations that do not depart from the gist of the invention are intended to be within the scope of the invention.

What is claimed:

1. A break-away assembly for a liquefied chemical transportation system, the break-away assembly comprising:
   a first adapter portion configured for releasable attachment to a liquefied chemical source and a second adapter portion configured for releasable attachment to a liquefied chemical destination, the first adapter portion and the second adapter portion being operatively connected to one another by a hose portion;
   a first valve assembly disposed within the first adapter portion;
   a second valve assembly disposed within the second adapter portion; and
   a stem connector operatively connecting the first valve assembly and the second valve assembly,
   wherein each of the first adapter portion and the second adapter portion includes, an outer coupling portion having a body including a central bore with the female threads, an inner flange extending radially inward from the body at one end, and an annular channel formed in the central bore, the annular channel being positioned proximate the inner flange; a center conduit portion having a body including a central bore, the central bore having a first portion with a first diameter, a second portion with a second diameter that is different from the first diameter, and a third portion having a third diameter that is different from the second diameter, and an outer annular flange that is sized and shaped to be at least partially received within the annular channel on the outer coupling; and an inner coupling portion having a body including a central bore and an outer annular extension that separates a first mating portion from a second mating portion, the first mating portion including outer threads configured to grip a portion of the hose portion, and the second mating portion including outer threads configured threadedly engage inner threads on the third portion of the center conduit.

2. The break-away assembly of claim 1, wherein the first valve assembly includes a first valve seat and a first valve plug, the first valve seat and the first valve plug cooperating to control fluid flow through the first valve assembly.

3. The break-away assembly of claim 2, further comprising a first valve extension, the first valve plug being operatively connected to the first valve extension.

4. The break-away assembly of claim 3, wherein the first valve extension has a longitudinal axis that is coincident with a longitudinal axis of the stem connector.

5. The break-away assembly of claim 4, wherein the first valve extension is secured within a first central bore of a first adapter portion with a first mounting bracket.

6. The break-away assembly of claim 5, further comprising a first spring seat that is operatively connected to the first mounting bracket.

7. The break-away assembly of claim 6, further comprising a first biasing element disposed between the first spring seat and the first valve plug, the first biasing element biasing the first valve plug towards the first valve seat.

8. The break-away assembly of claim 1, wherein the second valve assembly includes a second valve seat and a second valve plug, the second valve seat and the second valve plug cooperating to control fluid flow through the second valve assembly.

9. The break-away assembly of claim 8, further comprising a second valve extension, the second valve plug being operatively connected to the second valve extension.

10. The break-away assembly of claim 9, wherein the second valve extension has a longitudinal axis that is coincident with a longitudinal axis of the stem connector.

11. The break-away assembly of claim 10, wherein the second valve extension is secured within a second central bore of a second adapter portion with a second mounting bracket.

12. The break-away assembly of claim 11, further comprising a second spring seat that is operatively connected to the second mounting bracket.

13. The break-away assembly of claim 12, further comprising a second biasing element disposed between the second spring seat and the second valve plug, the second biasing element biasing the second valve plug towards the second valve seat.

14. The break-away assembly of claim 2, wherein the first valve seat forms a junction between the first portion and the second portion of the center conduit.

15. The break-away assembly of claim 8, wherein the second valve seat forms a junction between the first portion and the second portion of the center conduit.

16. The break-away assembly of claim 1, further comprising a first clamp that operatively and releasably connects the first adapter portion to the hose portion.

17. The break-away assembly of claim 1, further comprising a second clamp that operatively and releasably connects the second adapter portion to the hose portion.

18. The break-away assembly of claim 1, further comprising a first stem guide disposed within the inner coupling portion of the first adapter portion, between the first mating portion and the second mating portion.

19. The break-away assembly of claim 18, wherein the first stem guide comprises a body portion having a central opening that is sized and shaped to receive the stem connector.

20. The break-away assembly of claim 19, the first stem guide further comprising a plurality of outwardly extending wings.

21. The break-away assembly of claim 1, further comprising a second stem guide disposed within the inner coupling portion of the second adapter portion, between the first mating portion and the second mating portion.

22. The break-away assembly of claim 21, wherein the first stem guide comprises a body portion having a central opening that is sized and shaped to receive the stem connector.

23. The break-away assembly of claim 22, the first stem guide further comprising a plurality of outwardly extending wings.

* * * * *